United States Patent [19]
Kiernan

[11] 3,909,092
[45] Sept. 30, 1975

[54] PORTABLE CONSOLE
[76] Inventor: Thomas H. Kiernan, 1506 Seminole Rd., Grand Rapids, Mich. 49506
[22] Filed: May 17, 1974
[21] Appl. No.: 470,793

[52] U.S. Cl. .............. 312/235 A; 220/20; 220/306; 220/339; 224/42.42 A; 297/194
[51] Int. Cl.² .. A47B 83/00; B65D 1/00; A47C 7/68
[58] Field of Search ................. 312/235 A, 235 R; 220/31 S, 20, 339, 306; 297/194; 206/499; 224/42.42 A, 42.45 B, 29 D

[56] References Cited
UNITED STATES PATENTS

| | | | |
|---|---|---|---|
| 2,160,282 | 5/1939 | Rehg | 297/194 |
| 3,104,131 | 9/1963 | Krone | 312/235 A |
| 3,258,150 | 6/1966 | Braginetz | 220/31 S |
| 3,317,076 | 5/1967 | Enders | 220/31 S |
| 3,338,629 | 8/1967 | Drees | 312/235 R |
| 3,517,978 | 6/1970 | Hudson | 312/235 R |
| 3,762,342 | 10/1973 | Lawlor | 108/53 |

Primary Examiner—Paul R. Gilliam
Assistant Examiner—Kenneth J. Dorner
Attorney, Agent, or Firm—McGarry & Waters

[57] ABSTRACT

An integrally molded one-piece portable console for an automobile seat comprises an L-shaped container, with a back portion that rests on the automobile seat and a depending front portion that extends downwardly over the front of the seat. A top is pivotally connected to the container at the outer side thereof relative to the driver's position in the automobile by means of an integrally molded living hinge and is pivotable from a closed position to an open position, wherein the top is generally level and serves as an open tray.

6 Claims, 4 Drawing Figures

PORTABLE CONSOLE

BACKGROUND OF THE INVENTION

1. Field of the Invention

This invention relates generally to a portable console for an automobile and more particularly to an improved, integrally molded portable console, wherein the top thereof serves as an open tray when it occupies its open position.

2. Description of the Prior Art

Automobile desks or storage cabinets generally comprise an L-shaped container of some sort, having a back portion that rests on the automobile seat and a front portion that depends downwardly over the front of the front seat and rests against the drive shaft tunnel of the automobile. Such containers usually have a partitioned open interior for storing file materials and have a top which is pivotably connected to the open top of the cabinet along a front or back edge thereof by means of hinges. Generally, the top is flat and hard and is designed to serve as a writing surface when the top is closed. Such tops usually are disposed in a slanted position when the top is closed, in order to facilitate the use of the top as a writing surface in the automobile.

Heretofore, such automobile desks have suffered from several deficiencies. First, such desks are usually formed of wood or metal or a combination of both, and the various pieces are attached together by conventional metal fasteners or hinges. This type of desk is expensive and bulky.

Another and more serious deficiency with such writing desks is that no provision is made for the use of the writing desk while the top is in its open position, and no temporary storage area is provided for files that are being used while the desk is open. Hence, the operator must first lift the desk top to an upright position (which as stated before is accomplished by pivotally raising the desk top along the front or rear edge thereof), then remove the file material he desires to work on, and thereafter close the desk top and place the file material on the desk top for performance of any work operation. Since the vehicle is frequently moving and most desk tops typically are slanted to facilitate writing, materials tend to slide off the desk unless clipped to the surface. Also, since the desk tops are usually small, it is difficult to use the closed top for both a storage and work surface.

The present invention was evolved in order to overcome the foregoing deficiencies in prior automobile desks and to provide a simple and inexpensive portable console for an automobile which is aesthetically attractive and yet permits use of the console while the top is open and provides temporary storage space for files which are being used.

SUMMARY OF THE INVENTION

In accordance with the present invention, a portable console for an automobile seat having a driver's side and a passenger's side comprises an L-shaped container having an open interior and an open top, with the container comprising a rear portion that rests on the automobile seat and a depending front portion that extends downwardly over the front of the seat. The container has an inner side adjacent the driver's side and an outer side adjacent the passenger side of the car. A top is pivotally connected to the container along the outer side thereof, with the top being pivotable from a closed position, wherein the top closes the top of the container, to an open position, wherein the container is open and the top extends generally outwardly from the outer side of the container and serves as an open tray.

The top desirably has depending side walls which serve as upstanding edges of the open tray, and prevent materials from sliding off the tray.

To use the console of the present invention, the top is opened and the file materials to be used are placed in the open tray formed by the open top. Comments instructions, letters, or other memoranda or notes relative to the file materials are dictated into a portable dictating machine stored in the console and then the materials are replaced in the console and the top is closed. Since most salesmen currently employ portable dictating machines for purposes of making interim notes while on the road, rather than writing out all of their notes and memoranda by hand, the present invention is particularly adaptable to current day practice.

Another feature of the present invention is that the portable console is integrally molded from a moldable plastic material as a single unit, with the top and the container portion of the console being interconnected along the outside edges thereof by means of a living hinge. An integrally molded flexible clasp is incorporated as a closure for console. The depending front portion of the container is tapered at the bottom thereof so as to permit a plurality of containers to be stacked together for storage purposes. The console of the present invention is thus inexpensive and easy to manufacture while at the same time being strong, durable, and aesthetically attractive.

Another feature of the present invention is that a carrying handle is integrally formed in the front edge of the console, and this carrying handle permits a console to be carried about with no danger of the top coming open and the contents falling out of the container.

These and other objects, advantages, and features will hereinafter appear, and, for purposes of illustration but not of limitation, a preferred embodiment of the present invention is described in detail below.

DETAILED DESCRIPTION OF PREFERRED EMBODIMENT

Figure 4:
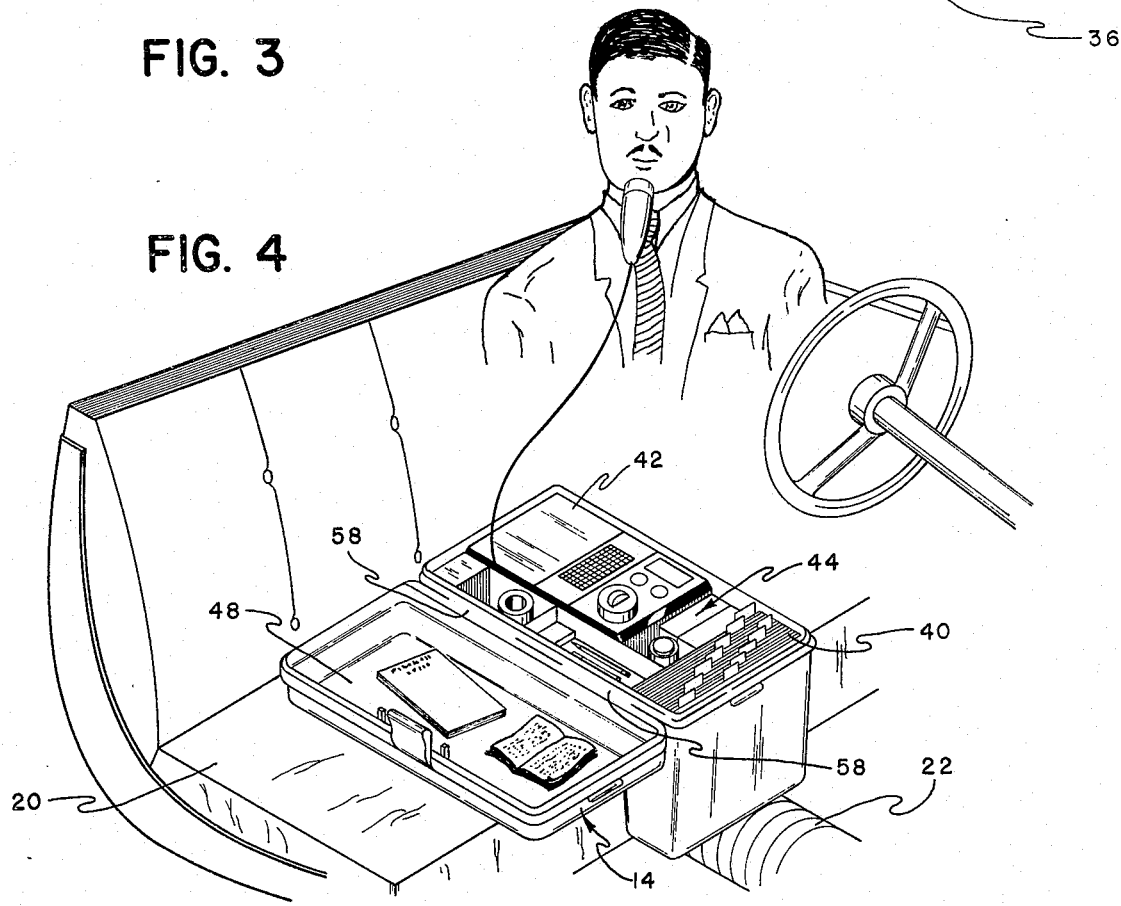
FIG. 4 is a pictoral view of the portable console of the present invention, showing the console being used while resting on the seat of an automobile.

Referring now to the drawings, a portable console 10 constructed in accordance with the present invention comprises an L-shaped container 12 and a top 14. Container 12 comprises a rear portion 16 and a front portion 18. As shown in FIG. 4, rear portion 16 of the console rests on an automobile seat 20, while front portion 18 depends downwardly over the seat and rests on the drive shaft tunnel 22 of the automobile.

L-shaped container 12 comprises an inner side wall 24 adjacent the driver's side of the automobile and an outer side wall 26 adjacent the passenger side of the automobile. L-shaped container 12 also comprises a rear wall 28 adjacent the back of the seat and front wall 30, with these walls defining the rear and the front sides of the portable console. Front portion 18 also comprises a tapered back wall 32. The bottom of L-shaped container 12 is formed by bottom surface 34 of rear portion 16 and bottom surface 36 of front portion 18. Preferably, the upper edge of L-shaped container 12 comprises a ridge 46 which extends around the perimeter of the open top of the container. This ridge reinforces the top of the container and provides a gripping surface or protrusion for a closure or clasp.

L-shaped container 12 is subdivided into a plurality of compartments by dividers or partitions 38. As shown in FIG. 4, these partitions are formed so as to accommodate file materials 40 in the depending front portion of the console, a dictating machine 42 in one compartment, and various other office supplies 44 in the other compartments.

In the preferred practice of the present invention, L-shaped container 12 and dividers or partitions 38 are integrally molded in a single piece from a moldable plastic material such as polyethylene, polyurethane, or the like. To this end, it is also preferable that front wall 30 and back wall 32 of front portion 18 be tapered inwardly from the top to the bottom of front portion 18 so as to permit a number of containers to be stacked one inside the other for purposes of storage. Since the portable console of the present may be manufactured in large numbers quite rapidly, the additional storage capability provided by tapering the depending front portion provides a significant advantage for the present invention.

Figure 3:
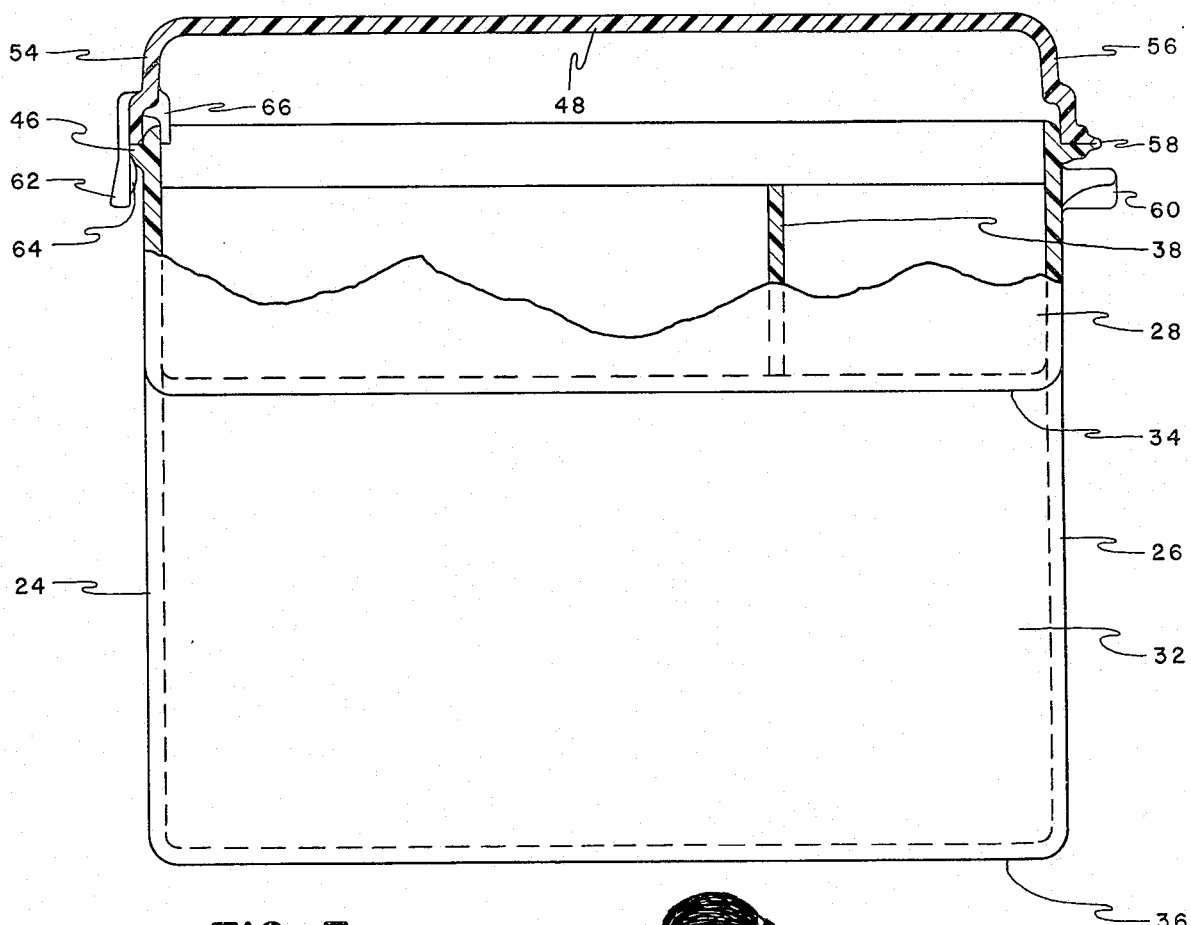
FIG. 3 is a rear end view of the portable console of the present invention, with the rear end surface being partially broken away in order to show the construction of the interior of the console.

Top 14 of the present invention comprises a top surface 48 and front, back, inner, and outer side walls 50, 52, 54, and 56, respectively. The side walls depend downwardly from top surface 48 and are formed so as to engage the top of the container when the top is closed. As shown in FIG. 3, there is an overlap between the lower edge of the top side walls and the upper edge of the sides of L-shaped container 12.

Figure 1:
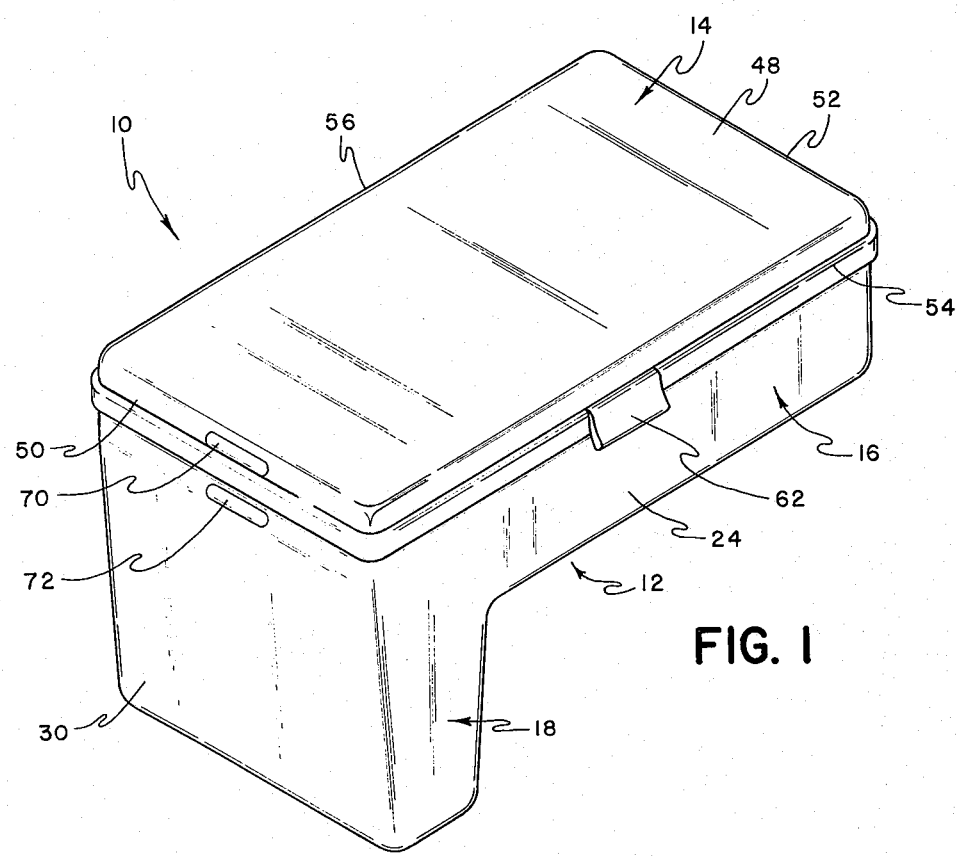
FIG. 1 is a perspective view of the portable console of the present invention, showing the top in its closed position.
Figure 2:
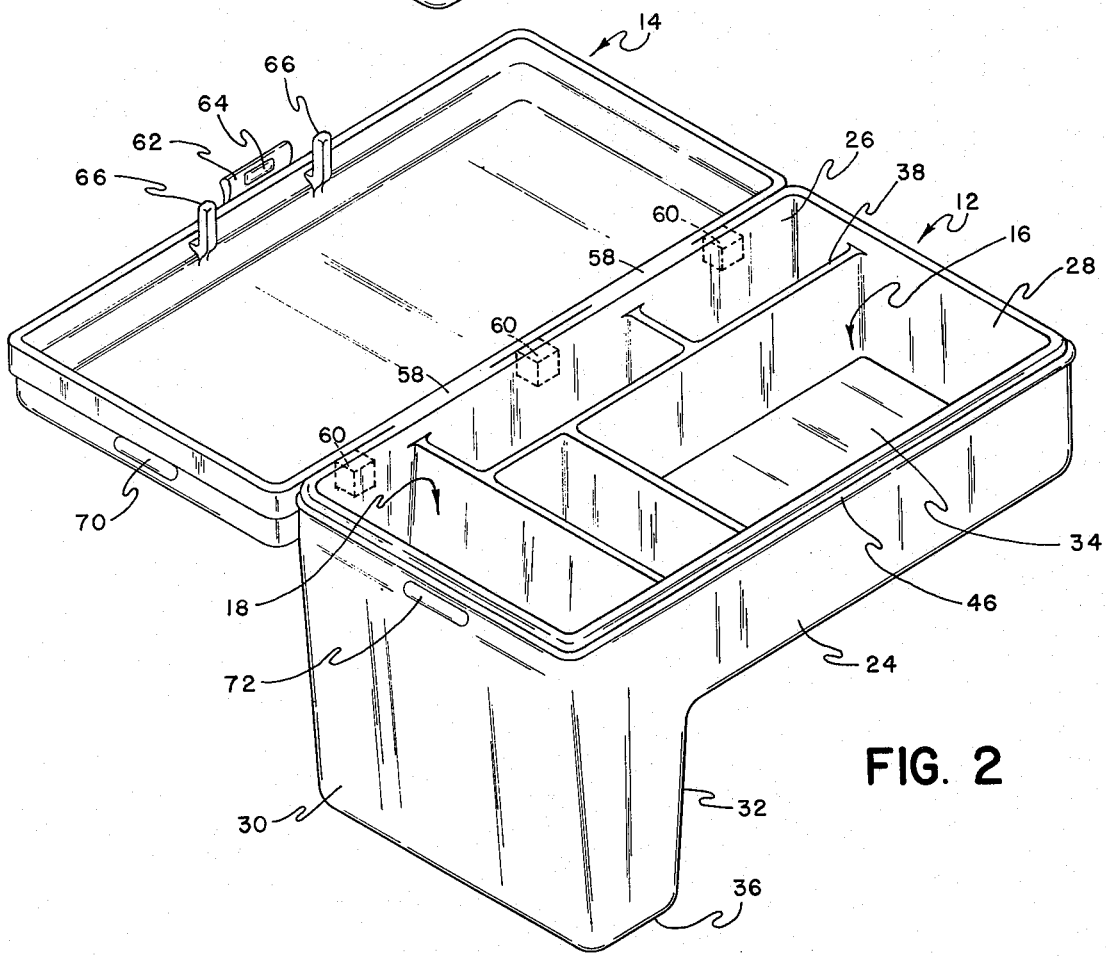
FIG. 2 is a perspective view of the portable console of the present invention, showing the top in its open position.

Top 14 is pivotally attached to L-shaped container 12 by means of hinges 58. In the preferred practice of the present invention, top 14 is integrally molded of moldable plastic material along with L-shaped container 12, and hinges 58 comprise integrally molded living hinges interconnecting the two elements along the outside edges thereof. Living hinges 58 permit the top 14 to be lifted from a closed position (as shown in FIG. 1) through an angle of approximately 180° to an open position (as shown in FIG. 2).

In order to hold top 14 in a generally level position when the top is open, L-shaped container 12 comprises at least one and preferably a plurality of stop projections 60 integrally formed on the outer side of the container adjacent the top of the container. These projections extend outwardly from the container a sufficient distance to engage outer side wall 56 of the top when the top is in a level position, thereby holding the top in a level position and preventing the top from moving through an angle of greater than 180°. Preferably, three stop projections are employed, one on each end of the container and one in the middle of the container.

Top 14 is held in its closed position on L-shaped container 12 by means of a flexible clasp or closure 62, which is integrally formed as a portion of the top in the molding process. Clasp 62 extends downwardly from the inner side wall of the top, and protrusion 64 extends inwardly from the inner surface of the clasp, such that when the top is in its closed position, protrusion 64 resiliently fits over protruding ridge 46 on L-shaped container 12, to hold the top in its closed position. It would of course be possible to accomplish the closure feature of the present invention by employing a short protrusion on L-shaped container 12 instead of a ridge extending around the entire perimeter of the L-shaped container, in which case, protrusion on the clasp would be positioned so as to engage the protrusion on the L-shaped container when the top is in its closed position.

In order to provide a close and snug fit between flexible clasps 62 and L-shaped container 12, a pair of depending guide members 66 are integrally formed on the interior surface of the inner side wall of the top adjacent each side of the protrusion on the clasp. Guide members 66 are positioned so as to be immediately adjacent the interior surface of the container when the top is closed, so that the guide members and clasp form a narrow channel in which the inner side of the container snugly fits when the top is closed. The combination of the flexible clasp and the guide members 66 insure firm clasping action when the top is closed.

Another feature of the present invention is the incorporation of a carrying handle 68 into the upper front edge of the portable console. Carrying handle 68 is formed by creating an upper opening 70 in the middle of the front side wall of the top and a lower opening 72 in the middle of the upper portion of front wall 30. These openings are immediately adjacent each other, and the overlapping portion of top 14 and L-shaped container 12 therebetween forms a convenient carrying handle for transporting the portable console when not in use in the automobile. By forming the carrying handle in this manner, the action of gripping the carrying handle holds the top in place on L-shaped container 12, thus insuring that the top will not fly open and the contents strewn on the ground when the portable console is carried from place to place.

Another advantage of the portable carrying handle aspect of the present invention is that a simple chain lock or the like may be wrapped around the steering column of the automobile and through the portable carrying handle in order to lock the portable console in the car. This simple lock mechanism provides an effective deterrent against theft.

In using the portable console of the present invention, the driver of the car first disengages flexible clasp 62 and opens the top to the position shown in FIGS. 2 and 4. When in this position, stop projections 60 hold the top in its level position, with the side walls of the top forming upstanding edges of a flat tray. The operator may then pull any file materials 40 out of the container and place them in the open tray for temporary storage while he is using them. As he works on the file materials he may dictate letters, notes, or memoranda into dictating machine 42 for later transcription by his secretary. When he is through with the materials, he takes the materials from the open tray and puts them back into the portable console and closes the portable console for the remainder of the trip.

As pointed out above, an important feature of the present invention is that the console is integrally molded as a single piece from a moldable plastic material and is designed principally for use in connection with dictating equipment as opposed to writing implements. Hence, the outer configuration of the portable console may be designed principally from an aesthetic viewpoint, with the principal objective being to make the portable console serve as a comfortable and attractive arm rest when not in use in the automobile. Accordingly, the top of the portable console may be slightly domed or given a pillowed effect, with rounded edges or the like. Also, a textured surface may be incorporated into the outer surface of the console, and the console may be produced in a wide variety of colors, according to the decoration scheme of the automobile in which it is to be used.

The foregoing is a description of one exemplary embodiment of the present invention, and it is contemplated that various modifications and changes may be made in the design and construction of this apparatus without departing from the spirit and scope of the present invention, as defined in the appended claims.

The embodiments of the invention in which an exclusive property or privilege is claimed are defined as follows:

1. An integrally molded plastic portable console for an automobile having a floor and a seat, the seat having a driver's side and a passenger's side, said console comprising:

an L-shaped container having an open interior and an open top, said container comprising a shallow rear portion that rests on the automobile seat and an inwardly tapering depending front portion that extends downwardly over the front of the seat toward the floor, said container having an inner side adjacent the driver's side and an outer side adjacent the passenger's side, said rear portion being subdivided into a plurality of individual compartments by means of integrally formed dividers;

a top comprising a top panel and depending side walls pivotally connected to the container by living hinges at the outer side thereof, said top being pivotable from a closed position, wherein the top closes the top of the container, to an open position, wherein the container is open and the top extends outwardly from the outer side of the container, the top being formed such that the top serves as an open tray when the top is open and serves as an arm rest when the top is closed;

stop means mounted on the outer side of the console for holding the top in a generally level position when it is open; and a carrying handle integrally formed in the console, said carrying handle comprising a hand opening at the top of the depending front portion of the container and a corresponding opening in the front of the top, with the openings being positioned so as to be in juxtaposition when the top is closed, the portions of the top and container between the openings forming the carrying handle.

2. A portable console as claimed in claim 1 wherein the stop means comprises at least one stop projection integrally formed on the exterior surfaces of the outer side of the container, said stop projection being positioned adjacent the top of the container and extending outwardly therefrom a sufficient distance to engage the outer side wall on the top when the top is open and in a level position.

3. A portable console as claimed in claim 2 wherein the stop means comprises three evenly spaced stop projections on the outer side of the container, and the top and container are interconnected by a pair of living hinges positioned between the stop projections.

4. A portable console as claimed in claim 1 and further comprising:

an outwardly extending ridge formed around the upper portion of the container; and an integrally molded flexible clasp extending downwardly from the inner side wall of the top to a position adjacent the ridge on the container, said clasp having a protrusion thereon that resiliently fits over the ridge on the container when the top is closed, thereby removably holding the top in its closed position.

5. A portable console as claimed in claim 4 wherein:

the clasp is formed on the exterior surface of the inner side wall of the top;

depending guide members are integrally formed on the interior surface of the inner side wall of the top adjacent each side of the protrusion on the clasp, said guide members being spaced apart from the clasp such that the guide members and clasp form a narrow channel in which the inner side of the container snugly fits when the top is closed, thereby assuring firm clasping action when the top is closed.

6. An integrally molded, one piece, moldable plastic portable console for an automobile seat having a driver's side and a passenger side comprising:

an L-shaped container having an open interior and open top, said container comprising a back portion that rests on the seat and a depending front portion that extends downwardly over the front of the automobile seat toward the floor of the automobile, said front portion being tapered inwardly as it extends downwardly, said container further comprising an inner side adjacent the driver's side and an outer side adjacent the passenger's side;

a domed top comprising a top surface and inner, outer, front, and back depending side walls corresponding to the four sides of the container, said top being formed so as to removably fit over the top of the container, said top serving as an arm rest when closed on the top of the container;

an integrally molded living hinge interconnecting the top to the top of the container at the outer sides thereof, said hinge permitting pivotal movement of the top from a closed position, wherein the top is closed, to an open position, wherein the top of the container is open and the top extends outwardly from the outer side of the container and serves as an open tray;

a plurality of stop projections extending outwardly from the upper portion of the exterior surface on the outer side of the container, said projections being formed so as to engage and hold the top in a level position when it is opened;

a protrusion formed on the upper portion of the exterior surface of the inner side of the container;

an integrally molded flexible clasp extending downwardly from the exterior surface of the inner side wall of the top at a position adjacent the protrusion on the container, said clasp having a protrusion thereon that resiliently fits over the protrusion on the container when the top is closed, thereby holding the top in its closed position;

depending guide members integrally formed on the interior surface of the inner side wall of the top adjacent each side of the protrusion on the clasp, said guide members being positioned immediately adjacent the interior surface of the container when the container is closed, such that the guide members and clasps form a narrow channel in which the inner side of the container snugly fits when the top is closed;

integrally molded dividers that subdivide the back portion into a plurality of individual compartments; and an integrally formed carrying handle in the front of the console comprising an elongated hand opening in the container adjacent the top of the front portion thereof and a corresponding elongated hand opening in the front side wall of the top opposite the hand opening in the container, said hand openings being formed so as to leave a section of top and container therebetween, which forms the carrying handle.

* * * * *